United States Patent

[11] 3,619,668

[72] Inventor Balthasar H. Pinckaers
 Edina, Minn.
[21] Appl. No. 67,445
[22] Filed Aug. 27, 1970
[45] Patented Nov. 9, 1971
[73] Assignee Honeywell Inc.
 Minneapolis, Minn.

[54] MINIMUM OFF-TIME CIRCUIT
 8 Claims, 1 Drawing Fig.
[52] U.S. Cl. .................................... 307/293,
 307/141, 317/13 R, 317/36 TD, 307/252 B
[51] Int. Cl. ........................................ H03k 17/26,
 H03k 17/28
[50] Field of Search ........................... 307/94,
 141, 141.4, 293; 317/13 R, 36 TD

[56] References Cited
 UNITED STATES PATENTS
3,434,028 3/1969 McCready .................. 317/13 X
3,445,725 5/1969 Vander Molen ............. 317/13

Primary Examiner—Donald D. Forrer
Assistant Examiner—John Zazworsky
Attorneys—Lamont B. Koontz and Alfred N. Feldman ABSTRACT: An alternating current contactor or relay which can be used for control of equipment such as refrigeration compressors is disclosed with a minimum off-time control. The minimum off-time control includes a resistor-capacitor timing circuit which charges initially from a power source through a transistor, and this is held in a charged condition while the current continues to flow through the transistor to energize a solid-state switch which energizes the contactor. In the event that a momentary interruption of power occurs, or in the event that power is removed, the capacitor starts to slowly discharge activating a second transistor circuit that shorts out the first transistor so that the output switch cannot be reenergized for some minimum period of time.

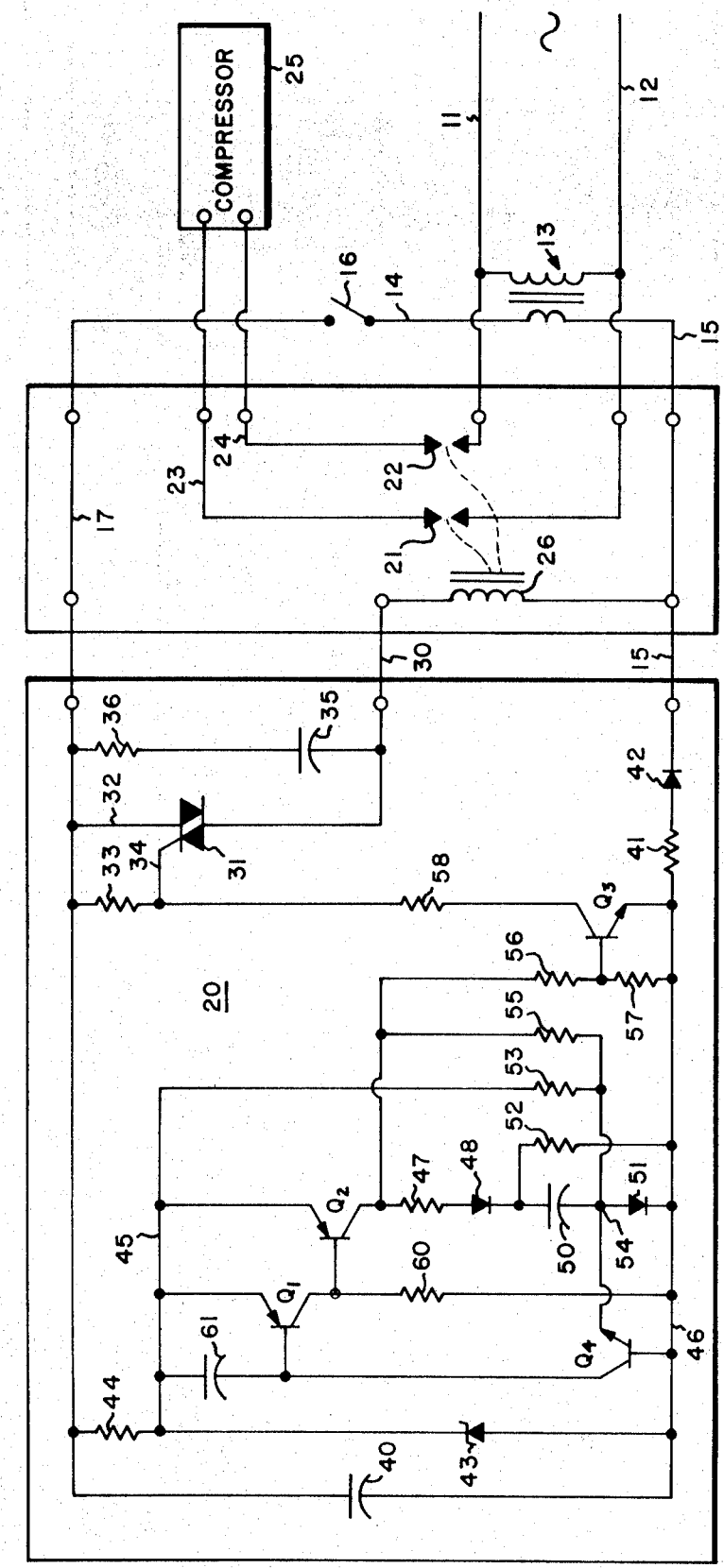

MINIMUM OFF-TIME CIRCUIT

BACKGROUND OF THE INVENTION

In the operation of electric refrigeration equipment, it is very desirable that once the hermetic compressor is deenergized that it be kept deenergized for some minimum period of time. This minimum period of time allows the pressure in the system to fall to a relatively low level so that the compressor, when it is restarted, does not start against a high pressure head thereby causing excess current drains and damage to the equipment.

SUMMARY OF THE INVENTION

The present invention is an electronic control circuit that can be added to a conventional contactor which is used to control equipment such as hermetically sealed compressors. The invention revolves around the idea of charging a timing capacitor initially upon energizing the circuit, and then allowing the circuit to continue normal operation until power is removed either intentionally or through some failure. Upon the removal or short interruption of power, the capacitor that has been charged is allowed to slowly discharge through a very large impedance and through the base-emitter circuit of a transistor. This base-emitter circuit acts as the control for a second transistor. When the second transistor is conducting, it shorts out the charging path for the capacitor and the activating path for the final output circuit that energizes the contactor. After a set time delay period in which the capacitor discharge is completed, the circuit regeneratively reverts to a condition similar to that at start-up and the system can be restarted.

BRIEF DESCRIPTION OF THE DRAWING

A single FIGURE of the present application is a complete schematic diagram of the minimum off-time circuit when connected to a conventional alternating current contactor and load means.

DESCRIPTION OF THE PREFERRED EMBODIMENT

A conventional pair of power lines 11 and 12 supply alternating current to a stepdown type of control transformer 13. Transformer 13 in turn supplies a low voltage (typically 25 volts) control potential on conductors 14 and 15 through a controller 16 and conductor 17 to a time delay circuit generally shown at 20.

The conductors 11 and 12 also supply electric power through contacts 21 and 22 to conductors 23 and 24 to a load means 25, that is disclosed as a refrigeration-type of compressor. The contacts 21 and 22 are normally open contacts of a control device 26 in the form of a contactor or electromagnetic type of relay. The contactor 26 is connected by conductor 30 through a current control device 31 that is disclosed as a solid state bidirectional switch or Triac. THe switch 31 is connected by conductor 32 to the conductor 17 and allows current to flow from conductor 17 through conductor 32, the bidirectional solid state switch 31, contactor coil 26, and conductor 15 whenever an appropriate signal is supplied across a resistor 33 that is connected at 34 to the gate terminal of the Triac 31. When a sufficient current flows in resistor 33, a potential is developed across the resistor 33 which is connected by conductor 34 to the Triac 31 so that the Triac 31 conducts to energize the contactor or relay 26 to close the contacts 21 and 22 to supply energy to the compressor or load 25. A capacitor 35 and a resistor 36 are connected across the Triac 31 to provide for transient voltage suppression, as is conventional. The entire circuitry disclosed to this point is a conventional load control or hermetic motor control utilizing a Triac and contactor. The invention of the present application is in the manner in which the circuitry is energized and controlled.

When the controller 16, which can be a conventional switch or thermostat is closed, alternating current power is supplied on conductors 15 and 17 to a power supply means including a storage capacitor 40, a limiting resistor 41 and a rectifier or diode 42. The voltage across the capacitor 40 is regulated by a Zener diode 43, through a resistor 44, in a conventional fashion to supply a regulated direct current potential between the conductors 45 and 36.

Connected across the conductors 45 and 46 are a number of components including a transistor Q2 which has an emitter-collector circuit connected through a resistor 47, a diode 48, a timing capacitor 50, and a diode 51. A timing resistor 52 having a high resistance is connected across the capacitor 50 and diode 51 to provide a time delay function as will be brought out in connection with the operation of this portion of the circuit. A resistor 53 is connected between the conductor 45 and a junction 54 between the capacitor 50 and the diode 51. A resistor 55 is connected from the collector of transistor Q2 to the junction 54 and a voltage divider made up of resistors 56 and 57 are also connected from the collector of transistor Q2 to the conductor 46. The resistor 57 is connected in the base-emitter circuit of a transistor Q3 which has its collector connected through a resistor 58 to the resistor 33 in the gate 34 of the Triac 31. The transistor Q3 forms an output means for the time delay circuit 20.

The time delay circuit 20 further includes a transistor Q1 which is connected between the conductor 45 and a resistor 60 which is in turn connected to the conductor 46. The collector of transistor Q1 is connected directly to the base of transistor Q2. To complete the circuit, a capacitor 61 is connected in the emitter-base circuit of transistor Q1 and the base is further connected to the collector of a further transistor Q4 the emitter of which is connected to the junction 54. THe base of transistor Q4 is connected directly to the conductor 46. This completes all of the circuit components for the novel time delay circuit and its operation will be discussed in the subsequent paragraphs.

OPERATION

When it is desired to energize the load 25, the controller 16 is closed, thereby supplying energy from the step-down transformer 13 to the time delay circuit 20. Current flows immediately to provide a direct current potential between conductors 45 and 46 by charging the capacitor 40 through the diode 42. This direct current potential causes a current to flow in the emitter-base circuit of transistor Q2 and through resistor 60 driving the transistor Q2 into full conduction. Current then flows through transistor Q2 to charge the capacitor 50 to a potential governed by the potential appearing across conductors 45 and 46. At this same time, current flows through the emitter collector circuit of transistor Q2 through the resistor 55, and through the voltage divider including resistors 56 and 57. The voltage appearing across resistor 57 causes the transistor Q3 to conduct through the resistors 33 and 58 to provide a gating signal for the Triac 31. The Triac 31 is driven into full conduction through the contactor 26 thereby closing the contacts 21 and 22 to supply a high voltage energization of the load means 25. As long as the controller 16 is closed and electrical energy is supplied on conductors 11 and 12, the transistor Q2 continues to conduct, as does the transistor Q3, and the Triac 31. This keeps the load means 25 continuously energized until one of two events occurs.

The first event that can occur is the opening of the controller 16. If the controller 16 is opened, all current is removed from the time delay circuit 20 and from the circuit through the Triac to the contactor coil 26, thereby opening the contacts 21 and 22 in a conventional fashion.

During the time that the controller 16 is open, the capacitor 50 begins to discharge through the resistor 52 and the base-emitter circuit of transistor Q4. This discharge is a slow process due to the high resistance of the resistor 52 and in the present application normally the discharge time is in the three to five minute range. With a discharge current flowing through the base-emitter circuit of transistor Q4, any application of voltage between the conductors 45 and 46 would cause the transistor Q1 to conduct through its emitter-base circuit and through the conducting transistor Q4 thereby driving the transistor Q1 into conduction. Since the transistor Q1 is placed across the emitter-base junctions of transistor Q2, any conduction of transistor Q1 shorts out the emitter base of transistor Q2 and prevents it from conducting should a voltage appear across the conductors 45 and 46. As soon as the capacitor 50 completes its discharge through resistor 52 and the transistor Q4, the ability of transistor Q1 to conduct ends and any application of potential between conductors 45 and 46 would cause the transistor Q2 to conduct in a normal fashion to energize the contactor 26.

By way of example, the application of this particular invention has utility where momentary loss of power occurs between conductors 11 and 12 due to some line fault, or due to a momentary opening and closing of the controller 16. This type of momentary opening and closing could be an individual changing a thermostat setting wherein the controller 16 was part of a conventional thermostat. In hermetic compressor applications it is very undesirable to momentarily remove power from the compressor motor and then restart the motor as it tries to start against a substantial pressure head and draws excessive current thereby tripping out overloads or damaging the compressor itself. If it is assumed that the system is operating with the load means 25 energized and a momentary loss of potential occurs on conductors 11 and 12 or the controller 16 is momentarily opened and closed, the potential across conductors 45 and 46 is removed since the capacitor 40 immediately discharges through the transistor Q3 and the resistors 33 and 58. This removes the potential from between conductors 45 and 46 and the capacitor 50 begins its discharge through the base emitter circuit of transistor Q4 thereby establishing a turn on potential for the transistor Q1 in the event that power is reestablished between conductors 17 and 15.

If it is assumed that power is reestablished between the conductors 17 and 15, the power supply immediately again provides a voltage between conductors 45 and 46. Since the transistor Q1 has a turn-on bias due to the conduction of current through transistor Q4, transistor Q1 starts to conduct immediately between its emitter and collector thereby shorting out the emitter-base circuit of transistor Q2. Q2 cannot conduct and as long as transistor Q2 cannon conduct the Triac 31 cannot be brought into conduction to energize the load means 25. As soon as the capacitor 50 has been substantially discharged, in approximately 3 to 5 minutes in the present application, the transistor Q4 no longer is capable of keeping the transistor Q1 in full conduction and the emitter collector current in transistor Q1 decreases. This allows the transistor Q2 to start emitter-base conduction thereby turning transistor Q2 partially on until the regenerative feedback through resistor 55 causes Q4 and Q1 to suddenly become completely nonconductive which brings Q2 on to a full extent to quickly recharge timing capacitor 50 and to bring the system back into normal operation.

The present circuit is unique in that it does not inhibit the initial energization of the load means 25 but allows it to be energized in a normal fashion providing the circuit has not been energized within the previous 3 to 5 minutes. Any momentary interruption of line voltage or the momentary opening of the controller 16 sets into motion a 3 to 5 minute time delay in which the load means 25 cannot be reenergized. As soon as the time delay has elapsed, the circuit can be energized in a normal fashion. This protects the load means 25 against momentary power losses and the need to restart under adverse starting conditions. This particular arrangement has particular utility as has been indicated before in application to hermetically sealed refrigeration equipment, but can be used with any type of a load where it is desirable to keep the load out of operation for some fixed period of time once it is momentarily deenergized or has been deenergized for a period of time less than the time delay established by the resistor and capacitor time delay network made up of the resistors 52 and capacitor 50.

The applicant has disclosed one specific application of the present invention, that is in connection with the control of a Triac and contactor for a motor control or hermetic compressor type of load. The present circuitry could be applied in many other devices and can be modified to accomplish the same function by those skilled in the art. For this reason, the applicant wishes to be limited in the scope of the invention only by the scope of the appended claims.

The embodiments of the invention in which an exclusive property or right is claimed are defined as follows:

1. A time delay circuit adapted to keep a load deenergized for a minimum period of time after the load has been previously energized, including: power supply means adapted to be connected to a source of electric power to provide direct current potential supply means; first current control means conducting current from said direct current potential supply means to store energy in energy storage means upon initial application of power to said power supply means; and first current control means further normally continuing to conduct to operate output means connected to control said load; and second current control means connected to said direct current potential supply means and operable to discharge said stored energy from said energy storage means upon interruption of electric power to said power supply means; said second current control means discharging said stored energy and disabling said first current control means thereby preventing said first current control means from conducting during said discharge to prevent said load from being reenergized by said output means for a minimum period of time.

2. A time delay circuit as described in claim 1 wherein said first current control means is a transistor connected to conduct current to said energy storage means and said output means.

3. A time delay circuit as described in claim 1 wherein said energy storage means is a capacitor.

4. A time delay circuit as described in claim 1 wherein said output means includes semiconductor switching means.

5. A time delay circuit as described in claim 1 wherein said second current control means includes two transistors with a first of said transistors connected to short out said first current control means when said first transistor is conducting current; and a second of said transistors is connected to discharge the stored energy from said energy storage means thereby causing said first transistor to conduct.

6. A time delay circuit as described in claim 5 wherein said first current control means is a transistor connected to conduct current to said energy storage means and said output means.

7. A time delay circuit as described in claim 6 wherein said energy storage means is a capacitor.

8. A time delay circuit as described in claim 7 wherein said output means includes semiconductor switching means.

* * * * *